(12) United States Patent
Harwood

(10) Patent No.: US 10,801,147 B2
(45) Date of Patent: Oct. 13, 2020

(54) CLEANER SYSTEM AND METHOD FOR PLANT GROWING MEDIA

(71) Applicant: Just Greens, LLC, Newark, NJ (US)

(72) Inventor: Edward D. Harwood, Ithaca, NY (US)

(73) Assignee: Just Greens, LLC, Newark, NJ (US)

( * ) Notice: Subject to any disclaimer, the term of this patent is extended or adjusted under 35 U.S.C. 154(b) by 133 days.

(21) Appl. No.: 15/372,716

(22) Filed: Dec. 8, 2016

(65) Prior Publication Data
US 2017/0164564 A1 Jun. 15, 2017

Related U.S. Application Data

(60) Provisional application No. 62/265,137, filed on Dec. 9, 2015.

(51) Int. Cl.
| | |
|---|---|
| *D06F 9/00* | (2006.01) |
| *B08B 1/00* | (2006.01) |
| *B08B 1/04* | (2006.01) |
| *B08B 1/02* | (2006.01) |
| *A01G 31/00* | (2018.01) |

(52) U.S. Cl.
CPC ............... *D06F 9/00* (2013.01); *B08B 1/002* (2013.01); *B08B 1/02* (2013.01); *B08B 1/04* (2013.01); *A01G 31/00* (2013.01)

(58) Field of Classification Search
CPC .......... B25F 5/00; A01G 31/02; A01G 31/00; A01G 31/042; D06F 9/00; B08B 1/002; B08B 1/04; B08B 1/02; Y02P 60/21; Y02P 60/216
See application file for complete search history.

(56) References Cited

U.S. PATENT DOCUMENTS

| | | | | | |
|---|---|---|---|---|---|
| 1,714,273 | A | * | 5/1929 | Mabrey | A47L 11/36 68/13 R |
| 4,344,361 | A | * | 8/1982 | MacPhee | B41F 35/06 101/141 |
| 5,059,321 | A | * | 10/1991 | Bahr | B30B 9/02 210/386 |
| 8,533,992 | B2 | | 9/2013 | Harwood | |
| 8,661,612 | B2 | * | 3/2014 | Brunnstrom | A47L 11/302 15/322 |
| 2006/0265824 | A1 | * | 11/2006 | Knopow | A47L 11/33 15/27 |
| 2008/0295400 | A1 | * | 12/2008 | Harwood | A01G 31/02 47/61 |
| 2014/0116743 | A1 | * | 5/2014 | Brunnstrom | A47L 11/293 173/217 |
| 2014/0137471 | A1 | | 5/2014 | Harwood | |

* cited by examiner

*Primary Examiner* — Gregory R Delcotto
*Assistant Examiner* — Preeti Kumar
(74) *Attorney, Agent, or Firm* — McCarter & English, LLP; John Pillion

(57) ABSTRACT

Systems and methods are provided for cleaning a cloth or fabric that has been used for growing plants. The cloth or fabric may be separated from or mounted with respect to a tray or support during the cleaning operation. At least two opposed, rotating brushes engage the top and bottom surfaces of the cloth or fabric to abrade and clean those surfaces. In addition, spray units, e.g., high pressure fluid nozzles, may direct cleaning fluid against one or both surfaces of the cloth or fabric. Filtration and sterilization systems may also be associated with the cleaning operation.

14 Claims, 3 Drawing Sheets

CLEANER SYSTEM AND METHOD FOR PLANT GROWING MEDIA

CROSS-REFERENCE TO RELATED APPLICATION

The present application claims priority benefit to a provisional patent application entitled "Cleaner System and Method for Plant Growing Media" which was filed on Dec. 9, 2015, and assigned Ser. No. 62/265,137. The entire content of the foregoing provisional patent application is incorporated herein by reference.

BACKGROUND

Technical Field

The present disclosure is directed to systems and methods for cleaning plant growing media and, more particularly, to systems and methods that are effective for cleaning cloth flats after use as a growing media so as to permit effective and efficient reuse thereof. The disclosed systems and methods advantageously recycle the cloth, reduce labor, conserve water and remove stem and root biomass from the cloth flats in an effective and reliable manner without damage to the cloth.

Background Art

Aeroponic systems and methods for plant growth generally include a growth chamber, a light source, a nutrient solution source, one or more cloth or fabric support elements, and cloth or fabric that is supported by the cloth or fabric support elements. The cloth or fabric is generally selected so as to promote advantageous reuse, handling, germination properties and plant yield.

Advantageous aeroponic growing systems and methods and particularly advantageous cloth and fabric materials for use in aeroponic environments have been disclosed in commonly assigned US patent filings, namely U.S. Pat. No. 8,533,992 to Harwood and US Patent Publication No. 2014/0137471 to Harwood. The contents of both of the foregoing patent filings are incorporated herein by reference.

As used herein, a "flat" is made up of a metal support or tray (typically stainless steel) with a cloth or fabric stretched over one surface thereof. The cloth or fabric is removably mounted with respect to the support or tray, generally along the perimeter of both the support or tray and the cloth or fabric.

A conventional and manual way to clean the cloth or fabric after use in supporting plant growth and in preparation for reuse thereof is to remove the cloth or fabric from the support or tray, place the removed cloth or fabric on a surface, e.g., a table, manually scrape both sides of the cloth or fabric to remove debris (i.e., roots and stems), and wash the cloth or fabric in a washing machine. Manual scraping requires both strength and endurance from the person scraping. In addition, the scraping process makes a mess in the vicinity of the cleaning operation and occasionally damages the cloth or fabric. More particularly, cloth or fabric damage may result from the scraper inadvertently making holes in the cloth or fabric which, upon reuse of the cloth or fabric, undesirably allows nutrient solution to reach the top of the flat and thus defeat one of the cloth's main purposes—that is, being a barrier to nutrient spray. Still further, removing and reattaching the cloth or fabric with respect to the support or tray requires time and labor.

Cleaning the support or tray is also cumbersome and thus often avoided, other than to remove visible debris.

Early experimentation using high pressure water to remove stems and roots from cloth or fabric (without removal from the support or tray) was deemed unsatisfactory due to a combination of cost, noise, insufficient cloth retention to the support or tray, and potential damage to the cloth or fabric. Most of these difficulties have been addressed with power washing in a spray booth followed by wash and dry of the cloth. Waste is driven to a macerator at the bottom of the spray booth for disposal. However, a power washing approach suffers from various shortcomings, including inefficiency, high water usage, and labor intensity.

In view of the foregoing, improved systems and methods for cleaning of flats for use in growth processes are needed that effectively and reliably clean the fabric or cloth without damage and extensive manual labor. Improved systems and methods for cleaning of flats for use in growth processes that increase the speed of the cleaning operation and reduce water usage are also needed. These and other objectives are satisfied by the systems and methods disclosed herein.

SUMMARY

According to the present disclosure, improved systems and methods are provided that eliminate the need for manual scraping of cloth and fabric used in plant growth processes, thereby reducing labor and damage to the cloth or fabric, speeding up the process by, inter alio, eliminating the steps of removing the cloth or fabric from a support or tray in order to scrape and then reattaching the cloth or fabric to the support or tray in order to seed. In addition, the disclosed systems and methods advantageously eliminate a washing machine from the cleaning process, thereby obviating the need for water and chemical use associated therewith. Indeed, in exemplary implementations of the disclosed systems and methods, the water used to clean the cloth or fabric and/or the support or tray may be recycled (in whole or in part) to conserve it.

Still further, exemplary implementations of the present disclosure advantageously include means to reduce the weight of the residue. Less weight assists transport and allows management of dry matter mass for further processing.

The disclosed system and method may also include means to dry the cloth or fabric and, if the drying temperature is high enough, establish a pathogen kill step. The disclosed cleaning system may be used in a variety of plant growth environments and may be used to address cleaning operations relative to fungi, algae and the like.

Additional advantageous features, functions and benefits of the disclosed systems and methods will be apparent from the detailed description which follows, particularly when read in conjunction with the accompanying figures.

BRIEF DESCRIPTION OF THE FIGURES

To assist those of ordinary skill in making and using the disclosed systems and methods, reference is made to the accompanying figures, wherein.

DESCRIPTION OF EXEMPLARY EMBODIMENT(S)

Figure 1:
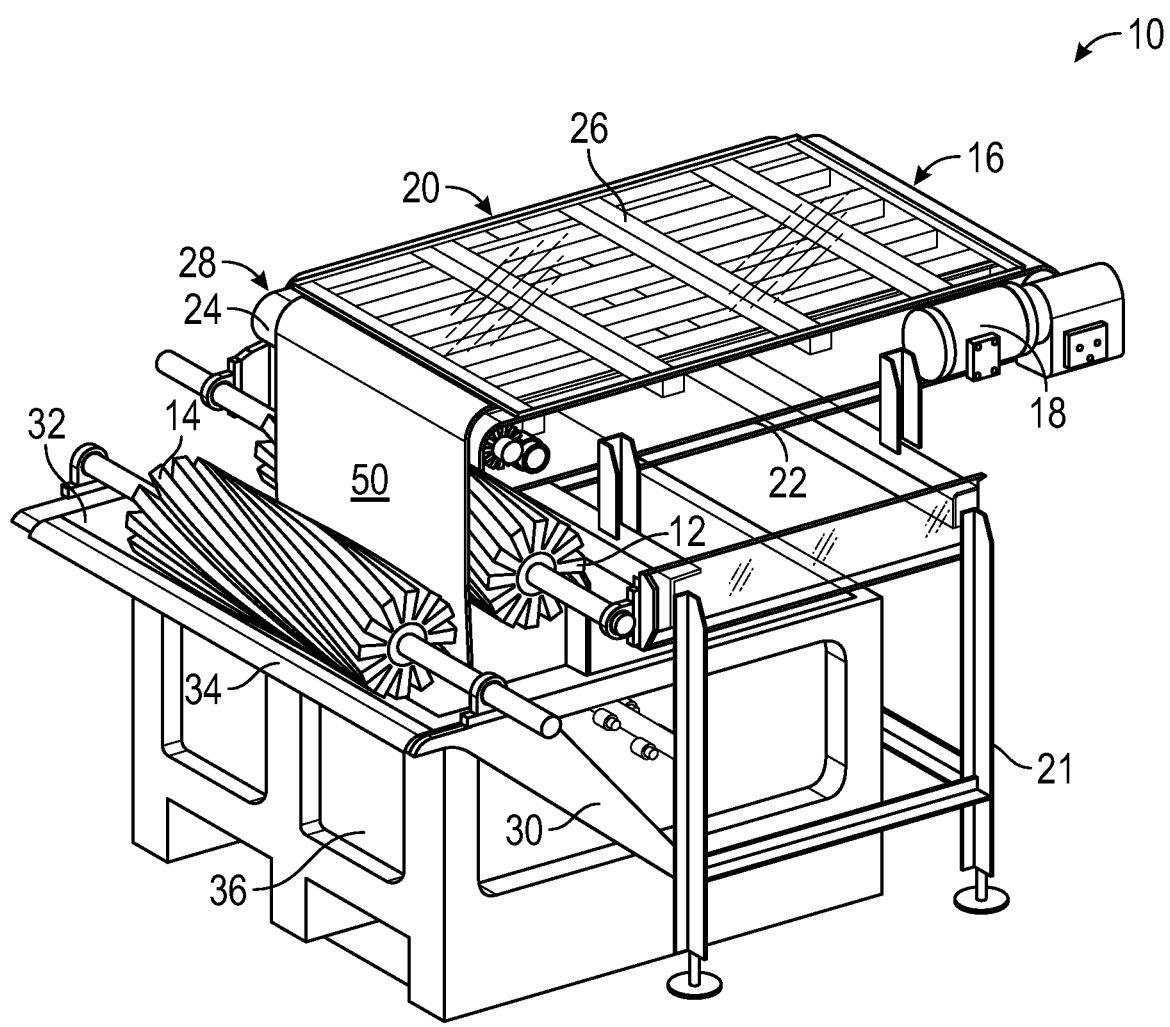
FIG. 1 is a schematic perspective view of an exemplary cleaner system according to the present disclosure.

According to the present disclosure, improved systems and methods for cleaning plant growing media are provided. More particularly, the present disclosure provides advantageous systems and methods that are effective for cleaning cloth flats after use as a growing media so as to permit effective and efficient reuse thereof. Exemplary implementations of the disclosed cleaning systems and methods are described herein below.

In an exemplary cleaning method according to the present disclosure, the following steps may be employed. However, as will be readily apparent to persons of skill in the art, the method steps described herein are susceptible to modification and/or variation without departing from the spirit or scope of the present disclosure. Thus, in exemplary embodiments, the disclosed method may be implemented according to the following method steps.

1. Place flat after harvest on an entrance end of the disclosed cleaner system. Of note, in exemplary implementations there is no need to disengage the cloth or fabric from the support or tray. Rather, the fully assembled flat is fed to the disclosed cleaner system after the previously grown plants have been harvested from the cloth or fabric. However, in other exemplary implementations of the present disclosure, temporary removal of the cloth or fabric from the support or tray may be undertaken to facilitate cleaning of the cloth or fabric.
2. Connect and engage a feed mechanism associated with the cleaner system to advance the flat through the disclosed cleaning apparatus. In instances where the cloth or fabric has been disengaged from the support or tray, only the cloth or fabric is engaged by the feed mechanism and advanced relative to the disclosed cleaning apparatus.
3. At the exit end of the cleaner system, remove the cleaned flat to the seeding operation for reuse. In instances where the cloth or fabric was disengaged from the support or tray for cleaning purposes, the cloth or fabric is reengaged with the support or tray before returning the cleaned flat to the seeding operation.
4. Of note, a final rinse of the cloth or fabric and support or tray with clean water is generally desired.
5. Water used to clean the flats is generally cycled from a reservoir below the cleaner apparatus, although the reservoir may be positioned, in whole or in part, in other locations proximate the cleaner apparatus. Occasional removal of debris and separation of water and organic matter in the reservoir is generally required. When the reservoir is full, liquid may be filtered or removed to sewerage or delivered to a separate reservoir of a plant growing system (e.g., a growing system of the type disclosed in U.S. Pat. No. 8,553,992 to Harwood). For the latter liquid use, the liquid transferred to the plant growing system reservoir functions to replenish the liquid transpired by the growing plants of the aforementioned plant growing system.

Thus, according to the disclosed cleaning method, the fabric or cloth associated with a plant growing system may be efficiently and effectively cleaned for reuse thereof. In addition, water usage is minimized and recycling of water used in the cleaning process is facilitated. As part of the cleaning process, a water replenishment source (e.g., a source of potable water) is generally associated with cleaning operations to ensure that sufficient water is available for the cleaning process. The water replenishment source may draw upon a various water sources, e.g., groundwater (e.g., aquifers), surface water (e.g., lakes and rivers), and desalination of ocean/sea water, and may be supplied by any conventional water service provider (e.g., a utility supplying water to the city, town or municipality in which the cleaning facility is located).

Further reuse of water used in the cleaning process in connection with a plant growing system is also facilitated. Indeed, the water/fluid used in the cleaning process may be effectively used at various points in a subsequent plant growing cycle, e.g., pre-moistening of seeds and/or cloth/fabric as part of a subsequent seeding process, and addition to a nutrient solution for use in feeding plants in a subsequent germination and/or growth cycle. Thus, reuse of the cleaning fluid may include at least one of pre-moistening of seeds for use in a subsequent growing process, pre-moistening of a cloth or fabric for use in a subsequent growing process, addition to a nutrient solution for use in feeding plants in a subsequent growing process, addition to a supply of cleaning fluid for use in a subsequent cleaning operation, and combinations thereof.

Exemplary cleaning systems according to the present disclosure will now be described. As will be apparent, the disclosed cleaning systems may be advantageously employed in the cleaning methods described above. In addition, as will be apparent to persons of skill in the art, the design and operation of the cleaning systems described herein are susceptible to modification and/or variation without departing from the spirit or scope of the present disclosure. Thus, in exemplary embodiments and with reference to the accompanying figures, the disclosed cleaning apparatus may be implemented as follows.

With initial reference to FIG. 1, an exemplary cleaner system 10 according to the present disclosure is schematically depicted. As shown in FIG. 1, the disclosed cleaner system 10 includes a pair of adjustably spaced cleaning brushes 12, 14 that are adapted to engage top and bottom surfaces of the cloth or fabric 50 to be cleaned. In the exemplary embodiment shown in FIG. 1, the cloth or fabric 50 is temporarily disengaged from the support or tray (not pictured) for cleaning purposes.

According to the exemplary embodiment of FIG. 1, the cloth or fabric 50 is fed to an entry end 16 of the cleaner system 10 in a horizontal orientation. A motor 18 is mounted with respect to a feed system 20 that functions to advance the cloth or fabric 50 in a controlled manner to the cleaning operation. For example, motor 18 may drive one or more belts 22 that rotationally drive first and second feed axles 24 positioned at opposite ends of feed system 20. Only one of the feed axles 24 is visible in FIG. 1—the second feed axle is hidden by motor 18. The feed system 20 is supported by frame 21.

Of note, the feed system 20 engages the cloth or fabric 50, e.g., between top and bottom engagement surfaces, so as to tension the cloth or fabric 50. In the exemplary embodiment of FIG. 1, top engagement surface 26 is visible in FIG. 1, whereas the bottom engagement surface is not visible below cloth or fabric 50. As will be apparent to persons skilled in the art, alternative mechanisms or structures for engaging the cloth or fabric 50 as part of the feed system 20 may be implemented, e.g., feed teeth associated with the feed axles that engage the cloth or fabric 50. The importance of the tensioning functionality will be apparent from the following discussion of the cleaning operation.

As shown in FIG. 1, the cloth or fabric 50 exits the feed system 20 at an exit end 28 and, in the exemplary embodiment of FIG. 1, travels substantially vertically therefrom between the adjustably spaced cleaning brushes 12, 14. In the exemplary embodiment of FIG. 1, only cleaning brush 14 is adjustable relative to cloth or fabric 50. Adjustability is accommodated by lever arms 30, 32 that are fixedly mounted at one end with respect to frame 21 and that permit angular motion of cleaning brush 14 relative to cleaning brush 12. A safety arm 34 extends between lever arms 30, 32 to prevent inadvertent user contact with cleaning brush 14.

Cleaning brushes 12, 14 are rotationally driven in opposite angular directions by a drive mechanism (not shown), e.g., a belt and pulley system, a chain and sprocket system or the like. Thus, in an exemplary embodiment, cleaning brush 12 is rotated counter-clockwise whereas cleaning brush 14 is rotated clockwise. The combined rotational action of cleaning brushes 12, 14 apply a force to cloth or fabric 50 that "advances" the cloth/fabric 50 relative to cleaning system 10. However, the angular velocity of the cleaning brushes 12, 14 is more than the linear feed rate of cloth or fabric based on the operation of feed system 20. In this way, the cloth or fabric 50 is maintained under tension relative to the angular force applied by cleaning brushes 12, 14. As a result, the cleaning surfaces of cleaning brushes 12, 14 frictionally engage opposed surfaces of the cloth or fabric 50 and dislodge debris therefrom.

Once the cloth or fabric 50 exits the cleaning operation associated with cleaning brushes 12, 14, the cleaned cloth or fabric is deposited within chamber 36 positioned therebelow. Chamber 36 may be periodically removed from its position below feed system 20 to remove and then reuse cloth or fabric 50 deposited therewithin. In addition, debris that is removed from cloth or fabric 50 may also be deposited in chamber 36. In the removal process, the debris may be rinsed or otherwise removed from the cloth/fabric 50 and the chamber 36.

As will be apparent, many variations may be implemented relative to the exemplary embodiment of FIG. 1. For example, multiple pairs of cleaning brushes may be employed and sequential pairs of brushes may be operated at differing angular speeds relative to other pairs of brushes. Also, the cleaning operation may be oriented in a horizontal plane or an angled plane relative to the horizontal, e.g., at an angle of 30° to 75°, thereby permitting the debris to be collected independent of or separate from the cleaned cloth or fabric. However, an angular orientation of the cleaning operation will require greater floor space as compared to the vertical orientation depicted in the exemplary embodiment of FIG. 1. Still further, one or more cleaning nozzles or other water delivery mechanisms may be positioned at various points along the cleaning operation to further enhance debris and algae removal from the cloth or fabric.

In an alternative to the exemplary cleaner system embodiment described with reference to FIG. 1, an alternative cleaning modality according to the present disclosure employs a high pressure spray to remove stems and roots with a minimum of water. The spray would optionally be directed to each side of the cloth simultaneously, e.g., as a replacement for or supplement to the cleaning brushes described with reference to FIG. 1. In certain instances, the use of high pressure water spray (e.g., 80-100 psi) may be more effective in removing debris, e.g., without a need for cloth or fabric removal from the support or tray.

Figure 2:
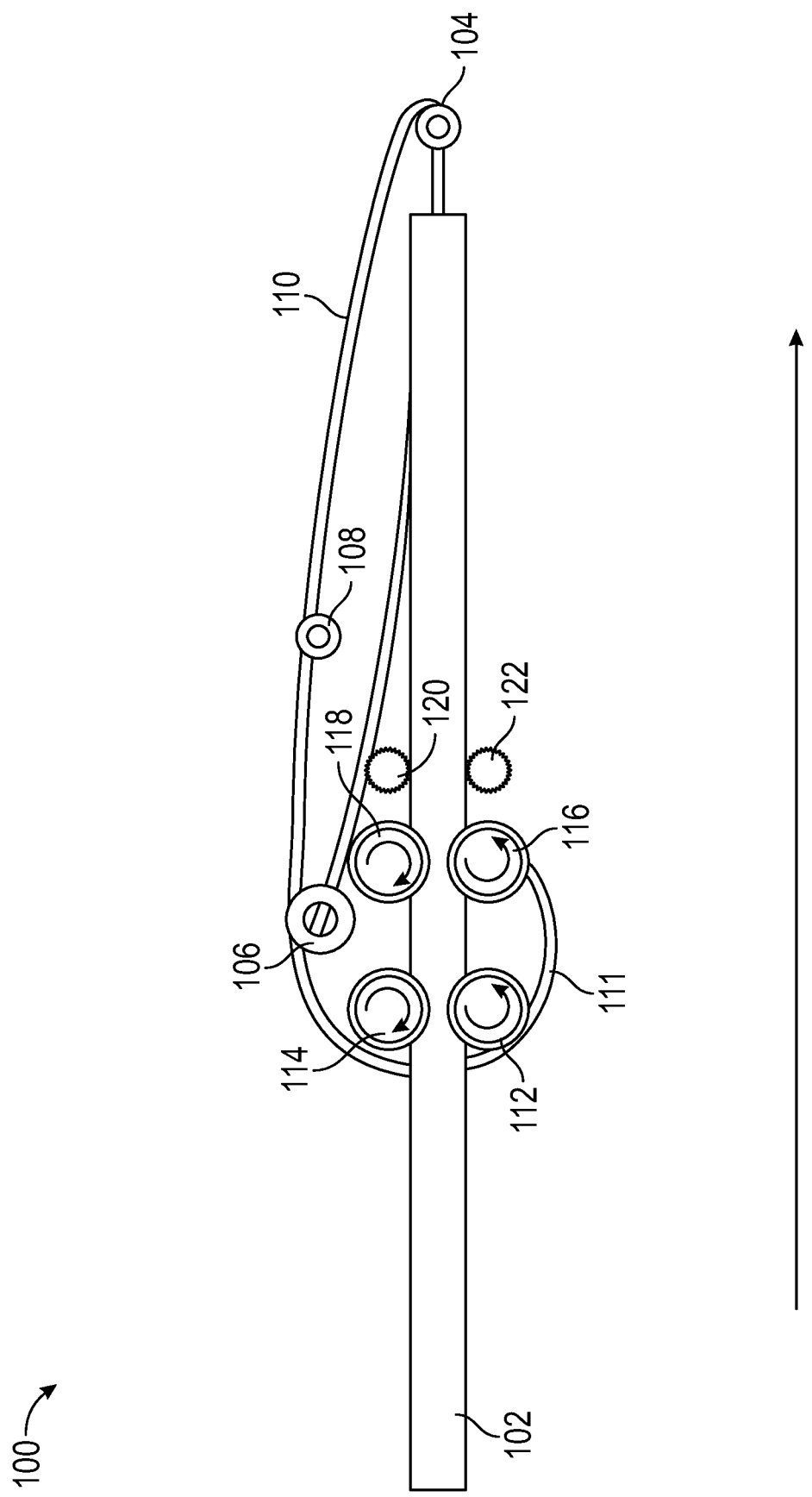
FIG. 2 is a schematic side view of a portion of an exemplary cleaner system showing the directional movement of a flat tray in connection with cleaning operations according to the present disclosure.

With reference to FIG. 2, a schematic depiction of an alternative cleaner system 100 is provided. Cleaner system 100 is designed to feed a cloth or fabric mounted with respect to a support or tray from the left side of the schematic depiction (see directional arrow at bottom of FIG. 2). The feed path 102 for the support or tray (that includes the used cloth or fabric to be cleaned) may include a pair of opposed, horizontally aligned feed channels that define a feed path for the support or tray (e.g., flat). In exemplary embodiments, a single motor and feed system may be employed to drive both the horizontal movement of the support or tray to be cleaned and the rotational motion of opposed cleaning brushes.

More particularly, cleaner system 100 includes at least two pulleys 104, 106 and an idler pulley 108 that cooperate with belts or cables 110, 111. Pulley 106 functions as the drive pulley and pulley 104 is a driven pulley. Pulley 104 functions to wind up a cable attached to the support or tray (e.g., flat) to draw it through the cleaning brushes and/or fluid spray system. Thus, drive pulley 106 translates drive force from a motor (not pictured) to a drive system (e.g., gears, rollers or the like) that (i) advance the support or tray from left to right in FIG. 2, and (ii) rotate the opposed cleaner brushes 112, 114 and 116, 118 to impart cleaning action relative to a cloth or fabric associated with the support or tray. Idler pulley 108 generally functions to impart tension and to facilitate repair or adjustment to the drive system. The opposed cleaner brushes 112, 114 and the opposed cleaner brushes 116, 118 rotate in opposite directions to effectuate the desired cleaning action. In exemplary embodiments, the rotational forces imparted to the cloth or fabric by the cleaner brushes are oppositely directed relative to the direction of movement of the cloth or fabric and associated support or tray.

Of note, cleaner system 100 advantageously includes opposed spray elements 120, 122 that are directed to the upper and lower surfaces of a cloth or fabric as it is fed thru cleaner system 100. The spray elements 120, 122 may take the form of nozzles that are adapted to deliver high pressure cleaning fluid, e.g., water, against the cloth or fabric to remove debris, algae and the like. Of note, the spray elements 120, 122 are preferably downstream (i.e., after) the cleaner brushes 112, 114, 116, 118, so that the debris (e.g., roots and stems) associated with the cloth or fabric is loosened and/or removed before being subjected to the fluid spray. In an alternative embodiment, the cleaner brushes and spray elements may be alternated, such that the cloth or fabric is subjected to cleaner brushes, then spray elements, then a second set of cleaner brushes and potentially further downstream repetitions. In this way, the cleaning functionality is further enhanced.

Once the cleaning fluid has been delivered to the cloth or fabric, cleaner system 100 may optionally be designed to collect and recycle the cleaning fluid. Although the exemplary embodiment of FIG. 2 shows two opposed spray elements 120, 122, it is contemplated that additional spray elements may be positioned along the feed path of the cloth or fabric. It is further contemplated that an uneven number of spray elements may be provided, e.g., more spray elements directed to the top surface as compared to the bottom surface, or vice versa.

After the support or tray (with associated cloth or fabric), i.e., the flat, has completed its residence in the cleaning region, i.e., exited from the last of the cleaner brushes and spray elements, then the cleaned support or tray with associated cloth or fabric, i.e., the flat, may be removed from the cleaner system 100 and readied for reuse in a growing system.

Figure 3A:
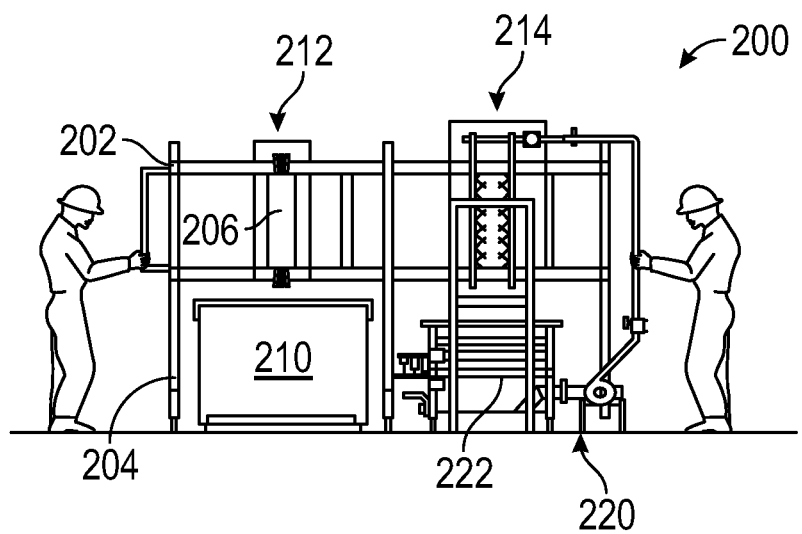
FIG. 3A is a schematic side view of a further exemplary cleaner system according to the present disclosure.
Figure 3B:
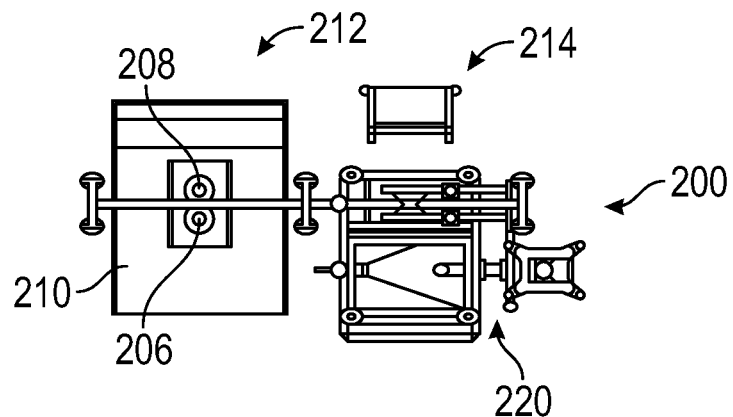
FIG. 3B is a top view of the exemplary cleaner system of FIG. 3A.
Figure 3C:
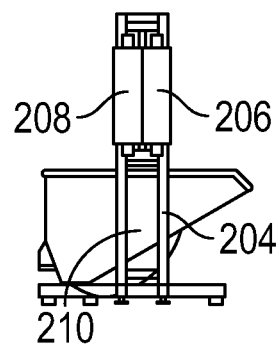
FIG. 3C is an end view of the exemplary cleaner system of FIG. 3A.

Turning to FIGS. 3A-3C, an additional alternative cleaner system 200 according to the present disclosure is schematically depicted. Cleaner system 200 includes a frame 204 that supports a feed path 202 for trays and supports that include cloths or fabrics mounted therein, i.e., flats. The feed path 202 generally travels from left to right in the side view of FIG. 3A and is designed to position and advance the trays and supports in a vertical orientation (as opposed to the horizontal orientation in which plant growth is supported). The trays and supports are initially fed to a cleaner brush region 212 and between opposed cleaner brushes 206, 208 which are rotationally driven to abrade the surface of the cloth or fabric mounted with respect to the tray or support.

Although only two opposed cleaner brushes 206, 208 are schematically depicted in FIGS. 3A-3C, additional cleaner brushes may be incorporated into cleaner system 200, whether in opposed pairs or in an unpaired fashion. For example, it may be desirable to include one or more additional cleaner brushes to engage opposed surfaces of the cloth or fabric, based on the prevalence of debris to be removed. In such instances, a stationary opposing surface may be provided on an opposed side of the feed path 202 so as to provide a firm surface against which an unpaired cleaner brush may act. A chamber 210 is generally positioned below the cleaner brushes 206, 208 to collect debris (e.g., stems and roots) that is dislodged from the cloth or fabric by the cleaner brushes.

After exiting the cleaner brush region 212 of cleaner system 200, the trays or supports with attached fabric or cloth, i.e., flats, are generally directed to a fluid-based cleaning region 214. In the fluid cleaning region 214, the vertically oriented tray or support is exposed to high pressure fluid, e.g., water, to further clean the surface of the cloth or fabric. As best seen in FIGS. 3A and 3B, a fluid manifold 220 with appropriate pumping, piping and valving is generally provided to deliver cleaning fluid, e.g., water, at high pressure (e.g., 80-100 psi) from sets of spray units, e.g., nozzles, to the opposed surfaces of the cloth or fabric. A filter system 222 may be provided in the fluid cleaning region 214 to filter and collect fluid that has been sprayed against the cloth or fabric. The filter system 222 may include physical filters, e.g., filter systems made from or including porous plastic, or cartridges with paper. The filter system may also include and/or provide photonic sterilization of the water, e.g., in the form of UV light/energy, to kill micro organisms in the water. In this way, fluid that is recycled for additional use in cleaning cloths and fabrics and/or flats may be filtered for debris (e.g., roots and stems) and the like. In addition, the present disclosure contemplates sterilizing the cleaned/substantially cleaned surfaces of the cloth or fabric after the cleaning operation is complete, e.g., using photonic/UV sterilizing energy. The sterilization operations of the present disclosure may be employed to kill a substantial amount of organic matter associated with the cleaning fluid, the cloth or fabric, the tray or support and/or the flat as a whole.

In practice, the value of removing much of the vegetative mass prior to spraying the cloth or fabric with high pressure fluid both saves water and results in a cleaner flat (i.e., tray or support with cloth or fabric). The incorporation of filtration and recycling means to recycle the sprayed water after some screening out of the particulates further enhances the cost effectiveness and environmental benefits of the disclosed cleaner systems and associate methods. Exemplary embodiments of the disclosed cleaner systems and associated methods also advantageously permit satisfactory cleaning of the cloth or fabric without requiring removal of the cloth/fabric from the tray or support.

The debris (e.g., roots and stems) dislodged from the cloth or fabric may be collected in various ways. In addition, the disclosed methods may further include step(s) to collect and concentrate the debris for ease of removal and/or downstream use. For example, the debris removal could be accomplished, in whole or in part, by moving physical bins containing the debris (in concentrated form or without a concentration step), by conveyor belt or by pumping the debris through a plumbing system.

With reference to the cleaning brushes described and employed herein, various brush materials and designs may be implemented to achieve the requisite cleaning operations. In an exemplary embodiment, the bristles/abrading features of the cleaning brushes are formed from a polyester material. In further exemplary embodiments, an open coil brush design may be employed to assist in directing the debris in a desired manner. Exemplary bristles may be approximately 2.5" to 3" in length, although the present disclosure is not limited by or to such bristle length/design. The bristle diameter is generally selected to provide a desired level of stiffness to provide effective cleaning functionality.

The length of the cleaning brush is generally selected based on the size/scale of the overall cleaning system. In an exemplary embodiment, brush length is about 32 inches, although the present disclosure is not limited by or to such brush size. The drive mechanism for the cleaning brushes may take various forms, but in an exemplary motor-driven system, the motor may drive the cleaner brushes by way of a sheave of approximately 1.5 inch depth. With this sheave dimension plus the bearing depth on each end of the cleaning brushes of about 1.5 inches means that one end of the brush may generally take the form of a 3 inch shaft with ANSI key and one end may be 1.5 inches long. The bearing and sheave may include ½ diameter shaft holes. The cleaning brushes may advantageously include a stainless steel backing and white bristles may be desired to assist in monitoring operation/maintenance issues.

In sum, operation of the disclosed cleaner system disclosed herein may include one or more of the following mechanisms that function to (i) pull a cloth or fabric through cleaning brushes (e.g., feed system 20 and the rotational forces imparted by the cleaning brushes themselves), (ii) rotate brushes relative to the cloth or fabric, (iii) clear brushes if necessary, (iv) supply water or other fluid to rinse and/or wash cloth or fabric, (v) pump reservoir to sewerage or plant growing system, (vi) enclose brushes and rinse functions for operator safety and enclosing splatter, (vii) screen debris, (viii) squeeze debris to remove water, and (ix) provide means for debris removal.

a. Considerations: Belt for brushes advantageously causes rotation in opposing direction of flat (or cloth/fabric) travel to ensure proper cleaning; sump is powered at all times; the drive only operates when cleaning a flat (or cloth/fabric) and can be emergency stopped. In exemplary embodiments, the orientation of travel of the cloth/fabric may be vertical (or substantially vertical), with an attendant benefit that the debris freed up from the cloth/fabric surface may feed to a collection chamber at least in part based on gravity or with assistance from liquid spray.

b. General safety considerations/requirements: enclosure of all moving parts, positive engagement of levers to move flat and turn brushes, stability of unit, simplicity of all operations, visibility of flat prior to entrance and after cleaning, and an e-stop and GFI-compliant electronics.

2. In exemplary embodiments of the present disclosure, the cleaner is integrated with a harvester so as to avoid a handling process between the two machines or systems, and to allow fluids dripping from the flat that is being harvested to be captured in the cleaner's reservoir.

Exemplary design specifications/requirements for brush-based cleaner embodiments of the present disclosure are summarized in the following tables

| General Specifications/Requirements | |
|---|---|
| Specification | Comment |
| Cloth compatibility | 30" × 30" |
| Nominal rate of output | 3 trays per minute |
| Output range | 1-5 trays per minute |
| Cleaning width (minimum) | 32" |
| Cloth cleaning process | Both sides |
| Output | Dewatered organic waste |
| Liquid disposal | Drain |
| Waste removal from machine | Bin with casters and/or pumping as a slurry |
| Waste bin size | 100 gallon |
| Cloth wash | Yes |
| Cloth sanitization | Yes |
| Organic matter removed from cloth | Fully removed |
| Cleaning of machine | Spray down |

| Controls Specifications/Requirements | |
|---|---|
| Specification | Comment |
| Power requirement | 480 v/3-ph/60 hz |
| Ingres protection (minimum) | IP-66 |
| Machine controls | Manual/Pushbutton |
| E-stop with alarms | Yes |
| Machine data output | optional |
| All components to be UL listed | Yes |

Although the systems and methods of the present disclosure have been described with reference to exemplary embodiments thereof, the present disclosure is neither limited by or to such exemplary embodiments.

The invention claimed is:

1. A method for cleaning a cloth or fabric used in a plant growing operation, comprising:
   a. engaging a cloth or fabric used to grow plants thereon between top and bottom engagement surfaces of a feed system;
   b. feeding the cloth or fabric at a linear feed rate between two opposed cleaning brushes that are spaced apart and rotating at angular velocities in an opposite direction relative to each other, thereby frictionally engaging and applying a force to both surfaces of the cloth or fabric through rotational motion of the two opposed cleaning brushes, wherein a first cleaning brush of the two opposed cleaning brushes frictionally engages and applies a force to a first surface of the cloth or fabric, and a second cleaning brush of the two opposed cleaning brushes frictionally engages and applies a force to a surface of the cloth or fabric that is opposite the first surface, wherein the angular velocities of the oppositely rotating cleaning brushes is greater than the linear feed rate of the cloth or fabric, thereby maintaining the cloth or fabric under tension as it is fed between the opposed cleaning brushes; and
   c. directing cleaning fluid to one or both surfaces of the cloth or fabric;
   wherein the cleaning brushes and the cleaning fluid are effective to clean both surfaces of the cloth or fabric for reuse in a plant growing system.

2. The method according to claim 1, wherein the cleaning fluid is water.

3. The method according to claim 1, wherein the cleaning fluid is recycled in whole or in part.

4. The method according to claim 1, wherein the cleaning brushes are driven by a drive system selected from a belt and pulley system and a chain and sprocket system.

5. The method according to claim 1, wherein the cleaning system is integrated with a harvesting system.

6. The method according to claim 1, wherein the two opposed cleaning brushes rotate so as to contribute forces in the feed direction of the detached cloth or fabric through the cleaning system.

7. The method according to claim 1, wherein the two opposed cleaning brushes rotate so as to contribute forces opposite to the feed direction of the detached cloth or fabric through the cleaning system.

8. The method according to claim 1, further comprising reusing the cleaning fluid in a plant growing operation.

9. The method according to claim 8, wherein the reuse of the cleaning fluid includes at least one of pre-moistening of seeds for use in a subsequent growing process, pre-moistening of a cloth or fabric for use in a subsequent growing process, addition to a nutrient solution for use in feeding plants in a subsequent growing process, addition to a supply of cleaning fluid for use in a subsequent cleaning operation, and combinations thereof.

10. The method of claim 1, further comprising sterilization of the cleaning fluid after use in cleaning the surfaces of the cloth or fabric.

11. The method of claim 1, further comprising sterilizing the cleaned surfaces of the cloth or fabric.

12. The method according to claim 1, further comprising a filtration system for filtering cleaning fluid after it has been directed against the first or second surface of the cloth or fabric.

13. The method according to claim 1, further comprising filtering the cleaning fluid after it has been directed against at least one of the surfaces of the cloth or fabric.

14. The method according to claim 1, wherein both surfaces of the cloth or fabric are simultaneously frictionally engaged through rotational motion of the two opposed cleaning brushes.

* * * * *